Patented Feb. 13, 1940

2,190,180

UNITED STATES PATENT OFFICE 2,190,180

CHEWING GUM MATERIAL

John O. Barker, New York, N. Y., assignor to Sweets Laboratories, Inc., New York, N. Y., a corporation of New York No Drawing. Application June 11, 1936, Serial No. 84,771

9 Claims. (Cl. 99—135)

The present invention relates to improvements in chewing gum material, with special reference to the production of a finished chewing gum which will develop a strong color in the gum, during chewing or mastication thereof in the mouth, substantially different from any color in the original chewing gum, the original chewing gum being dyed or not as desired.

Such development of the color during the chewing is produced by the action of the saliva in the mouth of the person chewing the gum. The invention involves the incorporation into the chewing gum material of a dyestuff which develops its color by solution, the said dyestuff being present in the finished gum in a dry undissolved condition, in which condition it does not exhibit its final color, to any substantial extent.

I give the following examples, purely for the purpose of illustration.

Example 1

A natural chewing gum base such as chicle or a suitable gutta, after being subjected to the usual cleaning processes, if necessary, is melted and dried. To each 1,000 pounds of the said material, 8 ounces of Yellow A. B. or Yellow O. B. is added, this having been dissolved in 2 pounds of white medicinal mineral oil, cocoa butter or other oil or fat or stearine, for example high melting point hydrogenated fatty oil. This is then thoroughly mixed by stirring, which gives a gum base having a strong yellow color. I then add (after cooling somewhat if desired), 24 ounces of dry powdered water-soluble, oil-insoluble Brilliant Blue, Indigotine, Sodium Indigo disulphonate or other certified food color. Since the base is in a dry condition and the dyestuff is added in a dry undissolved condition, there will be no appreciable change in color produced by such addition, and the base will still be of a strong yellow color.

Example 2

When using a synthetic chicle or chicle substitute, I dissolve the oil-soluble yellow in a part of the oil or hydrogenated oil or stearine which is one of the ordinary constituents of the chewing gum base, adding this material either to the rubber on the roller-mill, or to the batch of materials in the mixing kettle. After completion of the preparation of the chicle substitute, the same is well dried, and a water-soluble, oil-insoluble powdered blue dyestuff is added. Since there is no water or other solvent present for the blue dyestuff, the yellow color of the base will be substantially unaffected.

For the manufacture of finished chewing gum from the bases produced in either of the above-mentioned two examples, I melt or soften the base in a jacketed mixing kettle or other device, for example a mixing kettle provided with agitators. I add the sugar, called for by the chewing gum formula. For example I may use for 18 parts of base, 45 to 60 parts of powdered cane sugar, and well mix these together. Then I add glucose and flavoring (and/or medicinal agents), and proceed with the rolling and wrapping of the gum in the usual manner. The amount of glucose may be 20 to 25 parts, and owing to the large proportion of sugar already present, the water in the glucose does not act as a solvent on the dyestuff, to develop the color of the same.

The use of the blue dyestuff, which develops its blue color subsequently during the chewing of the gum, produces, by coaction with the yellow of the base, a strong green color when the gum is chewed.

The use of the yellow color in the above examples, can be omitted if desired, in which case the finished gum will be of about natural color, i. e., buff or brownish.

Any certified food colors can be used, and I do not restrict myself to the use of yellow and blue.

As illustrative of the use of a water-soluble dyestuff, I may use erythrosine in the first step. 6 to 8 ounces of erythrosine being dissolved in 2 to 4 quarts of water and incorporated with 1,000 pounds of the chewing gum base, to produce a reddish color. The base is then dried, and there is incorporated therein from 10 to 30 ounces of a suitable blue dye such as sodium indigo disulphonate, as a dry powder. The base and gum, in this case would be red or pink in color, but when chewed the gum will turn purple.

In the above examples, where yellow dye is mentioned, red can be substituted for blue, in the combination, giving a yellow gum which will change to orange color, on being chewed.

It will be understood that by the simple method of incorporating a dry water-soluble powdered dye with the uncolored base, there will be produced a gum which will develop any desired color upon being chewed. For using such dyes as erythrosine, instead of dissolving these in plain water, I can dissolve them in water containing a fruit acid, such as citric acid, in amount about equal to the dyestuff, which renders the color stronger, and also the color does not stain the saliva, or stains the saliva less than when said acid is not used.

In a modified form of carrying out the process, the undissolved dry dyestuff may be incorporated into the base along with the sugar, but this is generally less advisable.

I claim:

1. A process which comprises well incorporating with dry chewing gum material, a dry undissolved water-soluble oil-insoluble dyestuff which upon subsequent wetting with saliva of the mouth during chewing, will develop its color in the gum, imparting a strong color to the gum.

2. A process which comprises well incorporating with dry dyed chewing gum material, a dry undissolved water-soluble dyestuff capable of giving to the gum a color substantially different from that of the said dyed chewing gum material, and which said dyestuff upon subsequent wetting with saliva of the mouth during chewing, will develop its color in the gum, the amount of said undissolved dyestuff being sufficient to strongly color the gum.

3. In the manufacture of chewing gum, the steps of incorporating an undissolved dry water-soluble oil-insoluble dyestuff in chewing gum base, incorporating dry sugar into said base, and thereafter incorporating glucose into said material, the glucose containing some water but not enough thereof to develop the color from said dyestuff, said dyestuff being one that will develop its color in the gum, during ordinary mastication thereof.

4. A chewing gum material carrying intimately incorporated therein, a dry undissolved water-soluble dyestuff, which will develop its color in the body of the gum mass upon contact with the saliva during chewing.

5. A product as in claim 4, containing also a non-poisonous fruit acid which can render the color more permanent.

6. A chewing gum material which has well incorporated therein, a finely divided oil-insoluble water-soluble dyestuff substantially harmless to health when taken in small amounts, and which in aqueous solution gives a color very different from the color of said chewing gum material, and the amount of said dyestuff being sufficient to greatly alter the color of said chewing gum material when the latter is masticated in the presence of saliva.

7. A chewing gum material containing a dry undissolved water-soluble oil-insoluble dyestuff incorporated therein, and which gum material develops a strong color very different from any initial color of the said material, when being chewed.

8. In the manufacture of chewing gum, the steps of incorporating an undissolved dry water-soluble oil-insoluble dyestuff in a chewing gum base which has been dyed to a particular color, incorporating dry sugar in said base, and thereafter incorporating glucose therein, the glucose containing some water but not enough to develop the color from said dyestuff, said dyestuff being one that will develop a color widely different from that of the dye initially in said base, during ordinary mastication of the gum.

9. A dyed chewing gum material dyed by a dye dissolved in the gum material, and having incorporated therein a substantially dry undissolved water-soluble dyestuff which upon contact with the saliva of the mouth during chewing, will develop a color in the body of the gum mass which contrasts with that of the original dyed chewing gum material.

JOHN O. BARKER.